(12) United States Patent
Haas

(10) Patent No.: US 7,854,949 B2
(45) Date of Patent: Dec. 21, 2010

(54) WAFFLE SHEET

(76) Inventor: Franz Haas, Sellergrasse 4/11, A-1010 Vienna (AT)

( * ) Notice: Subject to any disclaimer, the term of this patent is extended or adjusted under 35 U.S.C. 154(b) by 1094 days.

(21) Appl. No.: 10/557,884

(22) PCT Filed: Feb. 19, 2004

(86) PCT No.: PCT/EP2004/050172

§ 371 (c)(1),
(2), (4) Date: Jul. 17, 2006

(87) PCT Pub. No.: WO2004/103077

PCT Pub. Date: Dec. 2, 2004

(65) Prior Publication Data

US 2007/0042085 A1 Feb. 22, 2007

(30) Foreign Application Priority Data

May 21, 2003 (AT) .......................... GM354/2003 U

(51) Int. Cl.
| A23G 9/44 | (2006.01) |
| A23G 3/02 | (2006.01) |
| A21D 13/08 | (2006.01) |
| A23L 1/216 | (2006.01) |
| A21B 5/02 | (2006.01) |
| A47J 37/06 | (2006.01) |

(52) U.S. Cl. ...................... 426/144; 426/515; 426/512; 426/637; 426/94; 426/104

(58) Field of Classification Search ................ 426/144, 426/515, 512, 637, 94

See application file for complete search history.

(56) References Cited

U.S. PATENT DOCUMENTS 1,374,522 A 4/1921 Peterson
(Continued)

FOREIGN PATENT DOCUMENTS

DE 208592 12/1907
(Continued)

OTHER PUBLICATIONS

Machine Translation of Cloer (DE19959465).*
(Continued)

*Primary Examiner*—Jennifer C McNeil
*Assistant Examiner*—Viren Thakur
(74) *Attorney, Agent, or Firm*—Andrew Wilford

(57) ABSTRACT

Disclosed is a waffle sheet as a long-life baked product, comprising one respective rib structure on opposite surfaces of a support layer. Said support layer has the shape of a corrugated plate (1, 10, 11, 12), e.g. with a sinusoidal or angular, trapezoidal undulation, the walls of said corrugated plate having the same thickness. Ribs (5, 5', 6) which penetrate or bridge the wave troughs (3, 3', 3", 3''') extend transversal to said undulation. The wave troughs (3, 3', 3", 3''') of both surfaces or the top face and bottom face touch or penetrate an imaginary center line (4) of the cross-section of the waffle. The average wall thickness of the ribs (5, 5, 6) corresponds to the wall thickness of the corrugated plate (1, 10, 11, 12). The ribs (5, 5', 6) extend at an angle from or perpendicular to the apex line of the waves. The ribs (6) in the wave troughs (3, 3') located on the top face are offset by half a separation relative to the ribs (5, 5') of the wave troughs (3, 3''') located on the bottom face. The angles (a, a ') of the zigzag-type undulation (14) or the radii of curvature (r, r') can be varied according to the amount of dough used per spatial unit. Also disclosed is a baking mold (13) comprising vapor bars (15) at the periphery thereof, said vapor bars (15) being provided with vapor slots on the undulation (14) which tapers as a slot.

6 Claims, 3 Drawing Sheets

U.S. PATENT DOCUMENTS

| | | | | |
|---|---|---|---|---|
| 1,708,499 | A | * | 4/1929 | Filbey .................. 99/377 |
| 1,950,734 | A | * | 3/1934 | Leaf ..................... 426/95 |
| 2,066,507 | A | | 2/1936 | Yost |
| 2,048,011 | A | | 7/1936 | Leaf |
| 2,376,585 | A | * | 5/1945 | Dickey .................. 99/340 |
| 2,769,387 | A | * | 11/1956 | Penick .................. 99/339 |
| 2,769,714 | A | * | 11/1956 | Stahmer ................ 426/144 |
| 2,769,715 | A | * | 11/1956 | Stahmer ................ 426/144 |
| 3,418,919 | A | * | 12/1968 | Nardon .................. 99/378 |
| 3,908,022 | A | | 9/1975 | Selleck |
| 4,508,739 | A | * | 4/1985 | Ryan .................... 426/144 |
| 4,601,227 | A | * | 7/1986 | Fitzwater et al. ......... 83/403 |
| 4,626,613 | A | * | 12/1986 | Wenham et al. .......... 136/255 |
| 4,931,301 | A | * | 6/1990 | Giuseppe ............... 426/505 |
| 4,973,481 | A | | 11/1990 | Hunt .................... 426/144 |
| 5,876,772 | A | * | 3/1999 | Biggs et al. ............ 426/241 |
| 6,027,753 | A | | 2/2000 | Reeves ................. 426/144 |

FOREIGN PATENT DOCUMENTS

| | | |
|---|---|---|
| DE | 715 657 | 12/1941 |
| DE | 935 721 | 11/1955 |
| DE | 4031218 C1 * | 4/1992 |
| DE | 44 21 200 | 1/1996 |
| DE | 199 59 465 | 6/2001 |
| FR | 701 239 | 3/1931 |
| GB | 960 721 | 6/1964 |
| GB | 2 121 274 | 12/1983 |
| GB | 2172185 A * | 9/1986 |

OTHER PUBLICATIONS

Translation of DE4031218 C1 to Albrecht.*
Translation of DE715657 to Westermann.*
Translation of DE19959465 to Cloer.*
Translation of DE208592 to Landbrieff.*

* cited by examiner

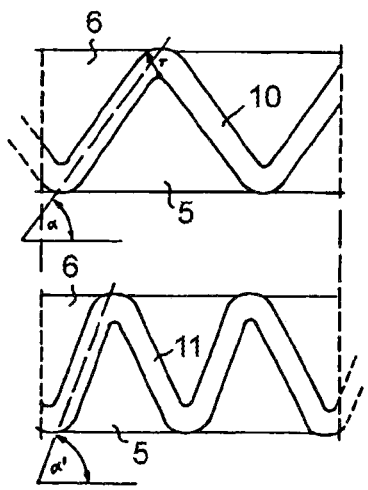
FIG. 3a
FIG. 3b
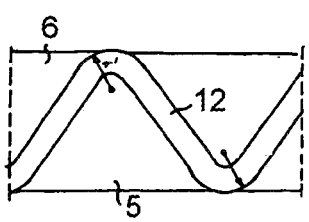
FIG. 4
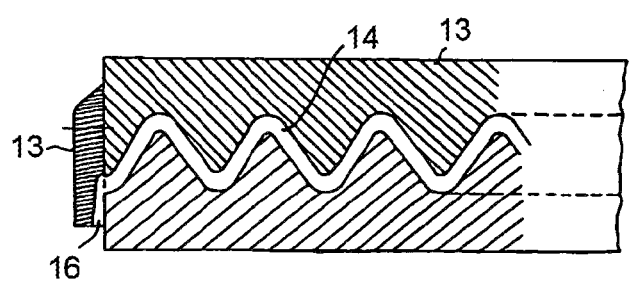
FIG. 5

WAFFLE SHEET

CROSS REFERENCE TO RELATED APPLICATIONS

This application is the U.S. national phase of PCT application PCT/EP2004/050172, filed Feb. 19, 2004 and claiming the priority of Austrian patent application GM354/2003 itself filed May 21, 2003.

TECHNICAL BACKGROUND

The invention relates to a wafer as a durable baked good that has ribs on both sides and that is shaped in a mold between a pair of planar structured outer baking plates and is there baked into a stable shape, the ribs of the rib structure extending from both faces of a support layer. In addition the invention relates to a heatable baking mold for making such a wafer.

Wafers are preferably layered together to make cream-filled pieces and form a multilayer product. They are also encased with chocolate and in single or multiple layers constitute a fine snack. Each such wafer has as a support layer a planar middle layer made from dough forming the core layer that carries the rib structure constructed as a field of square pockets. This rib structure is provided on both sides of the core layer. The rib squares can be staggered from one side to the other side by half the rib spacing.

The formation of the core layer leads to a buildup of dough underneath the ribs running their full lengths. Where the ribs cross this, dough buildup is at a maximum. Since the baking process between the baking plates takes place in a stationary position at a uniform temperature, these areas where dough is extra thick are not baked through if the wafer otherwise is cooked to have the desired golden brown color. The result is golden brown with pale spots in the uncooked regions. If the baking temperature is made higher, the thicker dough regions are baked through, but the wafer is elsewhere too dark, and its surface is burnt and distasteful. If the baking temperature is lowered, the baking time increases disproportionately in a very inefficient manner, e.g. from 1 minute to 3 minutes.

DISCLOSURE OF THE INVENTION

Technical Problem

It is an object of the invention to make a wafer such that thick spots in the dough are largely avoided, the wafer can be uniformly cooked in the shortest possible baking time, and a uniform surface color is produced.

Technical Solution

This is attained in that the support layer is formed as a corrugated layer of uniform thickness with both faces formed by straight lines that form a wavy or zig-zag line, the corrugation valleys of one face of the corrugated layer and the corrugation valleys of the other face reach to or overlap an imaginary center line in the cross section, the ribs have an average wall thickness corresponding to the thickness of the corrugated layer and extend at an angle or perpendicular to corrugation crest lines, and bridge the valleys preferably to the same depth, and the ribs of one face are offset from the ribs of the other face. It is significant that there is not the standard planar core layer as in the above-described wafers that causes the most buildup of batter. Overlapping crests of a corrugated or zig-zag shaped core layer are distinctly different according to the invention from a planar core layer. The overlapping of the crests enures that there is no throughgoing planar core layer serving as support layer. In an extreme case it is possible for the corrugation crests to touch a center line in the cross section of the wafer in the recesses in the opposite face. The tightly zig-zag corrugated wafers are only strong in one direction. The strength in all planar directions is attributed to the thin ribs in the corrugation valleys. They form together with the crest lines of the corrugations an array of pockets. The pockets can be perfectly square, rectangular, triangular, or even rhombic or trapezoidal. Of course the ribs can be provided on both sides of the corrugated layer. Staggering of the ribs on opposite faces prevents dough buildup.

All the features together produce a homogenous baked product that is durable. The residual moisture is thus less than 2%.

The wafers according to the invention can be used in many applications. The fine structure is particularly usable in the manufacture of candies with cream filling and coarser structures can be used as waffles for food. e.g. in combination with tasty coatings. A particularly distinguishing criteria is the batter content per unit of surface area of the wafer with no thick spots. According to use this can easily be changed with the wafer according to the invention.

To this end it is advantageous when to alter, that is increase or decrease, the batter content per unit of surface area of the wafer, by changing the angle, in particular between 45° and 75°, of the wave or zig-zag line of the corrugated layer forming the support layer to the imaginary center line with generally uniform wall thickness. It is also possible to alter, that is increase or decrease, the batter content per unit of surface area of the wafer, by varying the radius of curvature, in particular between 0.6 mm and 2 mm, at the crests of the corrugations with generally unchanged wall thickness and inclination angle.

The invention also relates to a heatable baking mold for making a wafer of the described type with relatively movable rectangular baking plates having surfaces complementary to the upper and lower faces of the wafer, the upper baking plate having edge bars that extend down past the edges of the lower baking plate of the closed mold. For practically carrying out the baking operation with optimal results it is advantageous when the bars are provided at the edges of the baking plate extending parallel to the crests of the corrugations with vapor slots that are spaced for example 2.5 cm apart along the surfaces of the bars and that when the mold is closed form passages about 1.5 mm wide and 0.8 mm deep that connect to the space at the corrugations in the baking plates for carrying off steam and that open outside at a narrow edge of the bars.

BRIEF DESCRIPTION OF THE DRAWING

The drawing shows in section an embodiment of a wafer as durable baked good, e.g. for making individual wafer confections.

FIG. 4 is like FIG. 3a but with larger radii of curvature, FIG. 5 a section through a baking mold with edge rails, FIG. 6 such a rail seen from inside, and FIG. 7 a baking form in isometric view.

PREFERRED EMBODIMENT OF THE INVENTION

A wafer is made by pouring liquid batter into a heatable baking mold comprised of two plates whose faces form the upper and lower faces of the wafer. The baking mold is closed by snugly interfitting the plates with the dough between them. Only a steam vent opens to the outside so that steam created inside by the baking operation can escape. The wafer is baked under pressure. The wafers are made individually, one after the other.

In a continuous method the dough is rolled out and continuously run through a fryer so the product lacks the desired structural detail and low moisture content.

Figure 1:
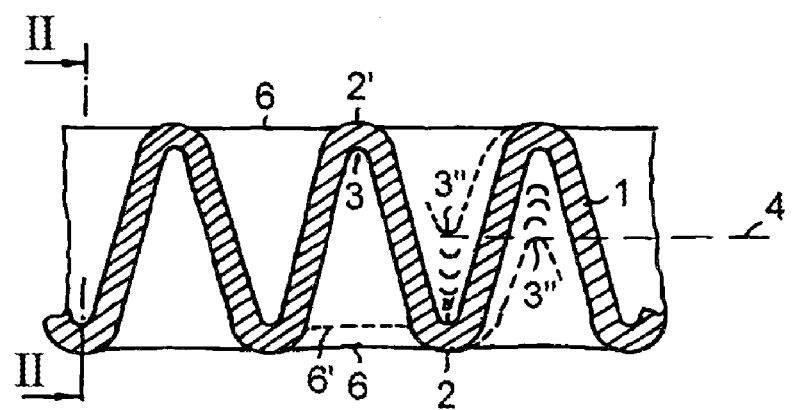
FIG. 1 is a cross section through a wafer according to line I-I of FIG. 2.
Figure 2:
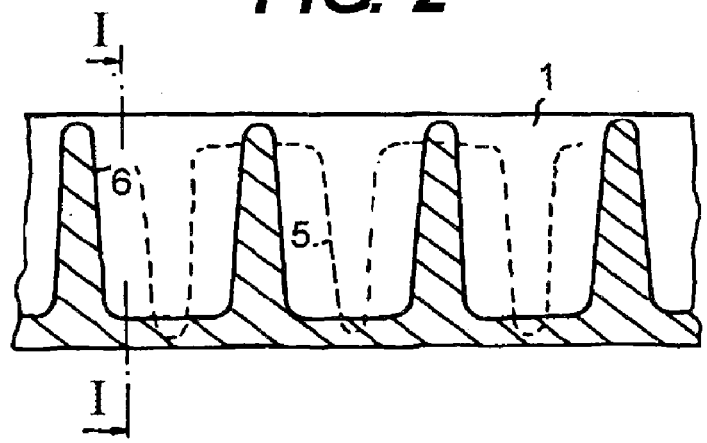
FIG. 2 is a longitudinal section through the wafer according to line II-II of FIG. 1, FIGS. 3a and 3b are sections through a part of a corrugated layer with crossing or zig-zag corrugations.

The wafer is comprised according to FIGS. 1 and 2 of a tightly wavy layer that is here termed a corrugated layer 1. This corrugated layer 1 is of uniform thickness throughout. For example the thickness is 0.6 to 2 mm and the corrugations are spaced at 3 to 5 mm. The corrugations extends along a zig-zag path which can be nearly sinusoidal. Corrugation crests 2 and 2' and valleys 3 and 3' succeed one another, being uniformly formed on both faces. It is significant that the valleys 3 and 3' overlap one another, so that they extend past or at least touch an imaginary center line 4. The most extreme case is shown in FIG. 1 in dashed lines at valleys 3$1''$ and 3$'''$. The corrugations can also follow a trapezoidal line and their height can reach 8 mm.

The corrugated layer 1 is seen geometrically as a family of parallel straight lines that follow a wavy line. The valleys 3 and 3' or 3$''$ and 3$'''$ are bridged by ribs 5 and 6 that in FIG. 2 reach nearly to the crests 2 and 2'. The can also be shorter as shown by line 5' in FIG. 1. The ribs 5 and 6 are in this embodiment evenly spaced and parallel to one another. On the lower face the ribs 5 are staggered relative to the ribs 6 on the upper face of the wafer. This is shown in FIG. 2 by the dashed-line rib 5.

The wafer according to the invention can be made as a finely structured durable baked good with a high dough content and no regions of dough buildup so that it is cooked all the way through its thickness and therefore meets the highest standards of homogeneity and uniformity.

The drawing shows a wafer with very close corrugations. The corrugations can of course be more widely spaced, with broad valleys. Preferably the spacing of the crest lines of the crests 2 on one side and crests 2' on the other side are the same as the spacing of the crests of the ribs 5, 5' and 6. In this manner in top view a square wafer has a square or rhombic (with angled) ribs layout.

FIGS. 3a and 3b show a section through part of a wafer. The wafer 10 conforms according to the invention to a zig-zag line with different angles $\alpha$ and $\alpha'$. The embodiment of FIG. 3a is more spread out than that of FIG. 3b. There the corrugations of the wafer 11 are closer. The angle $\alpha$ of the flanks of the corrugations 14 of the corrugated layer in FIG. 3 to the center plane 4 or a plane parallel thereto is about 55°. The angle $\alpha'$ in FIG. 3b is about 70°. One can see that with a piece of the same size the amount of batter relative to unit of surface area is greater in FIG. 3b than in FIG. 3a. In this manner when making up a wafer product the angle $\alpha$ or $\alpha'$ can be varied to increase or decrease the amount of batter per unit of surface area. The height of the wafer and its wall thickness (e.g. 1 to 2 mm) can remain unchanged.

The radius of curvature is shown in FIG. 3a at r; if this radius is changed, e.g. to r', (FIG. 4) while the wall thickness and height remain the same, there is also a change in the amount of batter per unit of surface, as a comparison of the corrugated layer 12 of FIG. 4 with that of FIG. 3a shows. Standard radii lie between 0.6 and 2 mm.

Figure 6:
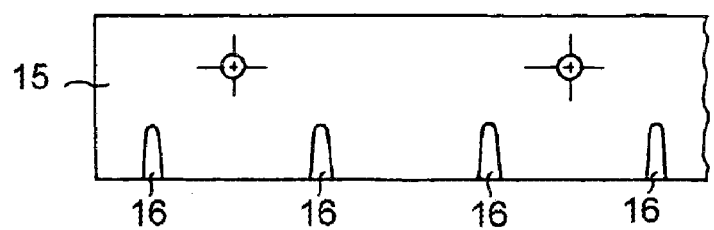

FIG. 5 shows an edge region of a baking mold 13 in cross section. The corrugations 14, which form a cavity between the baking plate holding the dough, extend to the edge and are there covered by a bar 15 that has uniformly spaced steam slots 16. The inside of the bar 15 is shown in FIG. 6 with the steam slots 16. The stem slots are about 1.5 mm wide, about 0.8 mm deep, and are spaced apart by 2 to 3 cm. The corrugations 14 in the halves of the baking mold 13 extend to the edge, preferably the longitudinal edge of the baking mold, as narrow slots that are vented via the steam slots 16. During baking steam moves through the dough filling the corrugation 14 and escapes at the longitudinal edges through the steam slots 16. The number, size, and position, generally along the corrugations 14 in the bar 16, is of some significance to the baking success.

Figure 7:
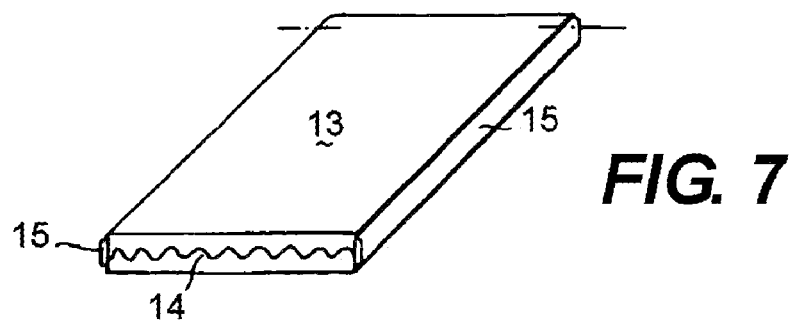

FIG. 7 shows in a simple view a closed baking mold 13 without seal bars at its ends, only with side steam bars 15. The baking mold 16 is rectangular and the steam bars 15 extend along its long sides, parallel to the crest lines of the corrugation 14, here mounted on the upper half of the mold. The so-called cover bars (not shown) are mounted on the short transverse sides (e.g. on the lower mold half). They serve for sealing and centering.

The invention claimed is:

1. An edible wafer constituted by a baked mass of dough unitarily forming
    a corrugated layer of uniform thickness having a pair of opposite corrugated and parallel faces each formed as a family of substantially parallel lines extending along a zig-zag path so as to form longitudinally extending corrugations defining on each face longitudinally extending valleys and longitudinally extending crests, the valleys of each face extending at least to a center plane substantially equidistant between the crests of the faces, and
    a row of longitudinally spaced and transversely extending ribs in each of the valleys, the ribs being of generally the same thickness as the corrugated layer, the ribs bridging the respective valleys and forming on each of the faces an array of outwardly open pockets, the ribs of each valley being offset longitudinally from the ribs of flanking valleys such that the pockets of each valley are also offset longitudinally from the pockets of the flanking valleys.

2. The edible wafer defined in claim 1 wherein the thickness of the corrugated layer and of the ribs is between 0.6 mm and 2 mm and the corrugations each have a transverse width of between 3 mm and 5 mm.

3. The edible wafer defined in claim 1 wherein the ribs are spaced transversely substantially the same as the crests.

4. The edible wafer defined in claim 1 wherein the ribs of each face have crests substantially coplanar with the crests of the respective face.

5. The edible wafer defined in claim 1 wherein the valleys of each face extend past the center plane.

6. The edible wafer defined in claim 1 wherein the ribs of each valley are equispaced longitudinally and centered between the ribs of flanking valleys.

* * * * *